United States Patent [19]
Velthoven et al.

[11] Patent Number: 6,101,686
[45] Date of Patent: Aug. 15, 2000

[54] INTERIOR TRIM SPRING CLIP

[75] Inventors: Michael J. Velthoven, Berkley, Mich.; Edoardo Panziera, Woodbridge, Canada

[73] Assignees: DaimlerChrysler Corporation, Auburn Hills, Mich.; Manchester Plastics, Ltd., Canada

[21] Appl. No.: 09/250,705

[22] Filed: Feb. 16, 1999

Related U.S. Application Data
[60] Provisional application No. 60/078,237, Mar. 17, 1998.

[51] Int. Cl.[7] ................................................. A44B 21/00
[52] U.S. Cl. ............................... 24/295; 24/289; 24/293; 24/297
[58] Field of Search ............................ 24/295, 289, 297, 24/293, 294, 458; 411/508

[56] References Cited

U.S. PATENT DOCUMENTS

| | | | |
|---|---|---|---|
| 3,683,622 | 8/1972 | Oehlke | 24/295 |
| 4,402,118 | 9/1983 | Benedetti | 24/295 |
| 4,601,247 | 7/1986 | Welch et al. | 108/152 |
| 5,517,731 | 5/1996 | Spykerman | 24/295 |
| 5,542,158 | 8/1996 | Gronau et al. | 24/295 |

*Primary Examiner*—Victor N. Sakran
*Attorney, Agent, or Firm*—Roland A. Fuller, III

[57] ABSTRACT

A spring clip has a first and second retention member. The first retention member retains a first part to the spring clip. The second retention member retains the spring clip in a second part. The second retention member provides for retention in a first and second position. In the first position, the first and second parts are in an engagement position and in the second position, the retention member enables servicing of the first part while still connecting the first and second members.

6 Claims, 2 Drawing Sheets

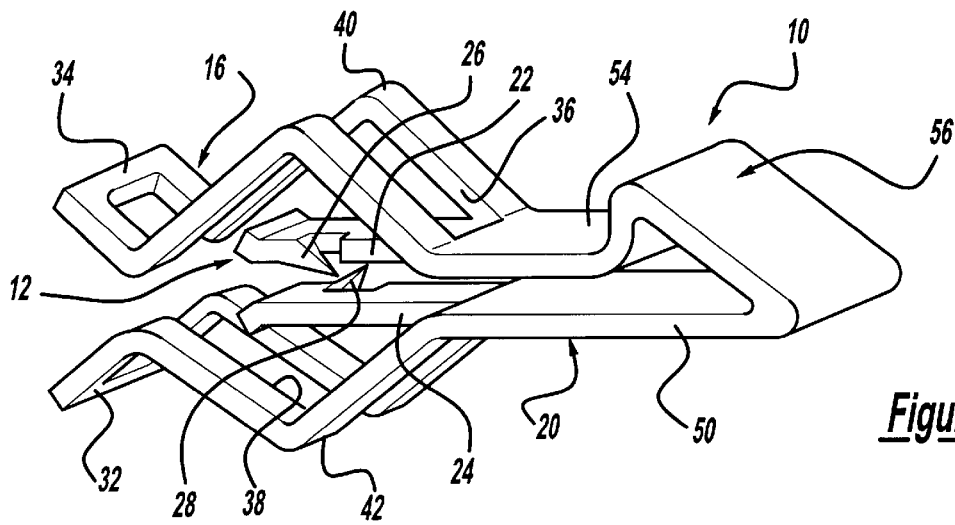
Figure - 1
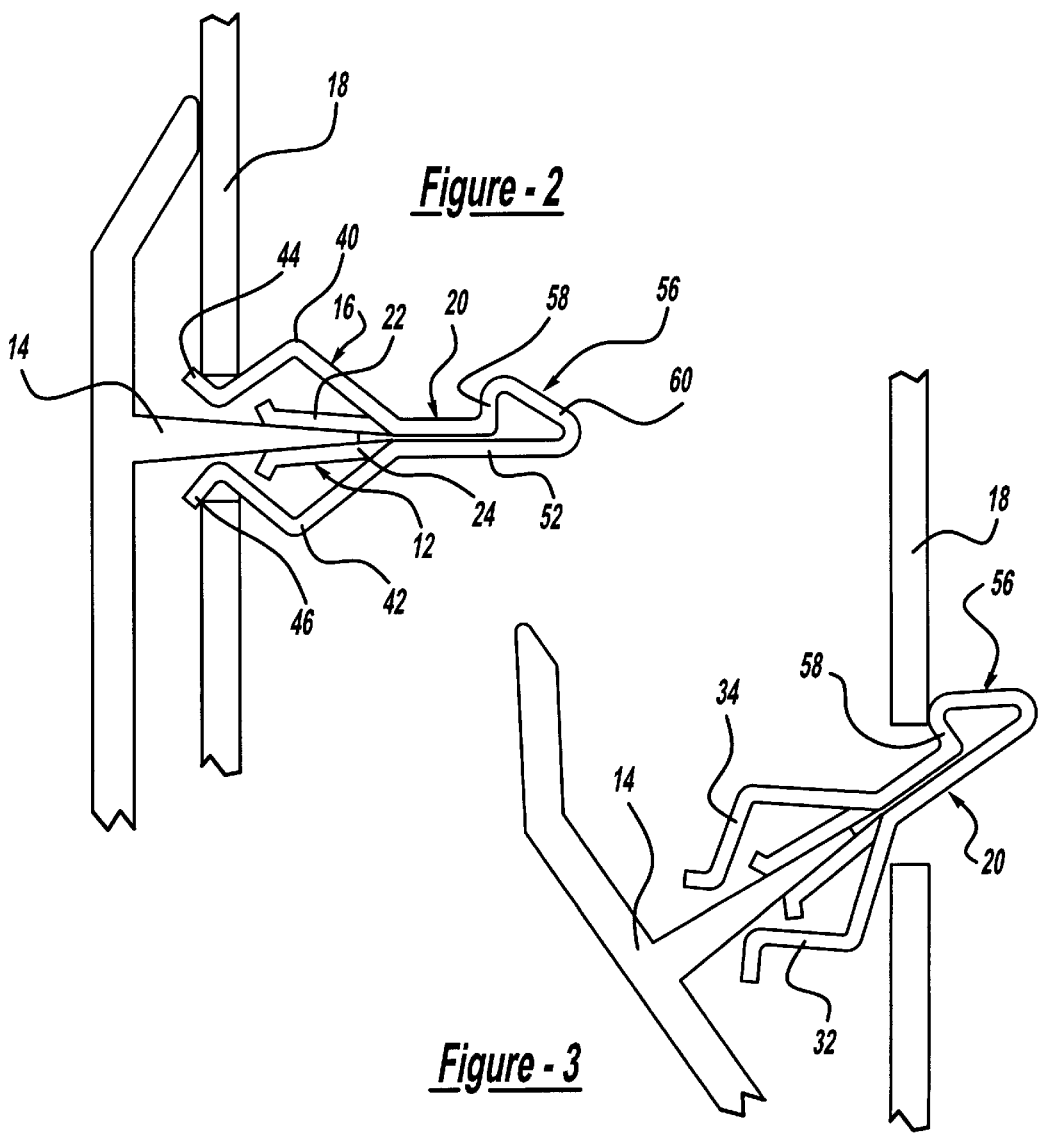
Figure - 2
Figure - 3

INTERIOR TRIM SPRING CLIP

CROSS REFERENCE TO RELATED APPLICATION

This application is based upon and claims priority to United States Provisional Patent Application Serial No. 60/078,237 filed Mar. 17, 1998, and entitled Interior Trim Spring Clip, the specification and drawings of which are herein expressly incorporated by reference.

BACKGROUND OF THE INVENTION

The present invention relates to fasteners, and more particularly, to automotive trim spring clips to retain a first and second part together.

In the automotive industry, parts are secured together with various types of fasteners. One type of fastener which designers prefer using are spring clips. Ordinarily, an aperture is in one part and the other part includes a projecting portion with a spring clip attached to it. The spring clips secure the two parts together while enabling easy separation of the parts from one another.

In some instances, it is desirable to adjust the two parts with respect to one another so that work can be conducted on one of the parts. In these cases, it is desirable that the parts move with respect to one another, yet still be connected by the spring clip. Accordingly, the spring clip has two positions. A first position where the two parts are secured with one another, and a second position where the parts are movable with respect to one another yet still connected with one another.

SUMMARY OF THE INVENTION

It is an object of the invention to provide a fastener which releasably secures two parts together. Also, it is an object of the invention to provide a fastener which enables one part to be manipulated with respect to the second part while the fastener connects the two parts together. Also, it is an object of the invention to provide a fastener which enables two positions of the parts with respect to one another while coupling the parts together in both positions.

Additional objects and advantages of the invention will be apparent from the detailed description of the preferred embodiment, the appended claims and accompanying drawings, or may be learned by practice of the invention.

BRIEF DESCRIPTION OF THE DRAWINGS

FIG. 1 is a perspective view of a spring clip in accordance with the present invention;

FIG. 2 is a side elevation view of the spring clip in a first secured position;

FIG. 3 is a side elevation view of the spring clip in a second position;

DETAILED DESCRIPTION OF THE PREFERRED EMBODIMENTS

Figure 4:
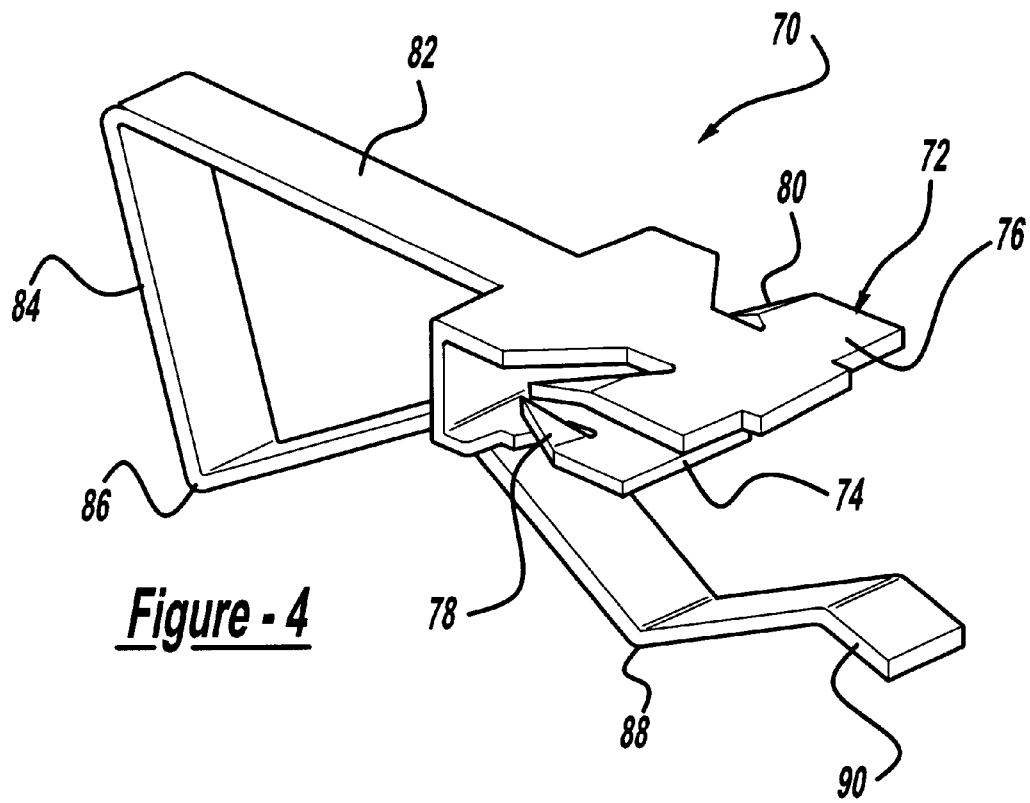
FIG. 4 is a perspective view of an additional embodiment of the present invention.

Turning to the figures, particularly FIG. 1, a spring clip is illustrated and designated with the reference numeral 10. The spring clip 10 includes a first pair of legs 12 to retain a first part 14 with the spring clip 10. Also, the spring clip 10 includes a second pair of legs 16 to secure the spring clip 10 with a second part 18. The spring clip includes a third pair of legs 20 which connects the spring clip 10 with the second part 18 when the first part 14 is in a servicing condition.

In FIG. 2, the first pair of legs 12 include opposing leg members 22 and 24. Each of the leg members includes retaining tabs 26 and 28 which grasp the part 14 to establish a friction connection between the spring clip 10 and the first part 14. A desired pulling force must be applied to the spring clip 10 to overcome the force of the tabs 26 and 28 so that the spring clip may be removed from the first part 14. The first pair of legs 12 are continuous with the third pair of legs 20.

The second pair of legs 16 are laterally spaced and surround the first set of legs 12. The second set of legs 16 include two legs 32 and 34, each including a cut-out 36 and 38. The cut-outs 36 and 38 are formed from the removal of the first legs 22 and 24. The second legs 32 and 34 have an outward bulging knee 40 and 42 dividing the legs 36 and 38 into two parts. Also, the legs include feet 44 and 46 which project away from the legs 36 and 38. The feet 44 and 46 ordinarily rest in the aperture of the second part 18 as will be described herein.

The third pair of legs 20 extend axially from the first and second pair of legs. The third pair of legs 20 include leg portions 52 and 54. Leg portion 52 is substantially flat. Leg portion 54 includes a projecting foot portion 56. The foot portion 56 includes a step 58 and an angled portion 60. Thus, the step and angle form a hook shape to retain the spring clip 10 in the second part 18.

Ordinarily, the spring clip 10 is stamped from a single piece of spring steel to form the clip 10. Thus, all of the legs are unitary with one another.

As seen in FIG. 2, the second pair of legs 16 retain the first part with the second part in an engaged position. Here, the first and second parts are in the desired position with respect to one another. In FIG. 3, in a servicing condition, the first part 14 is allowed to move away from the second part 18. However, the hook portion or foot 56 maintains the spring clip 10 in the aperture 62 of the second part 18. Since the foot 56 is wider than the second legs, it is retained in the aperture 62. However, by pushing on the leg 54, with a tool such as a screwdriver, the foot or hook 56 may be removed from the aperture 62. Accordingly, the spring clip 10 allows the two parts to be in an engaged position as well as enabling the first part to be removed away from the second part while still connecting the first and second parts 14, 18 through the spring clip 10.

Figure 5:
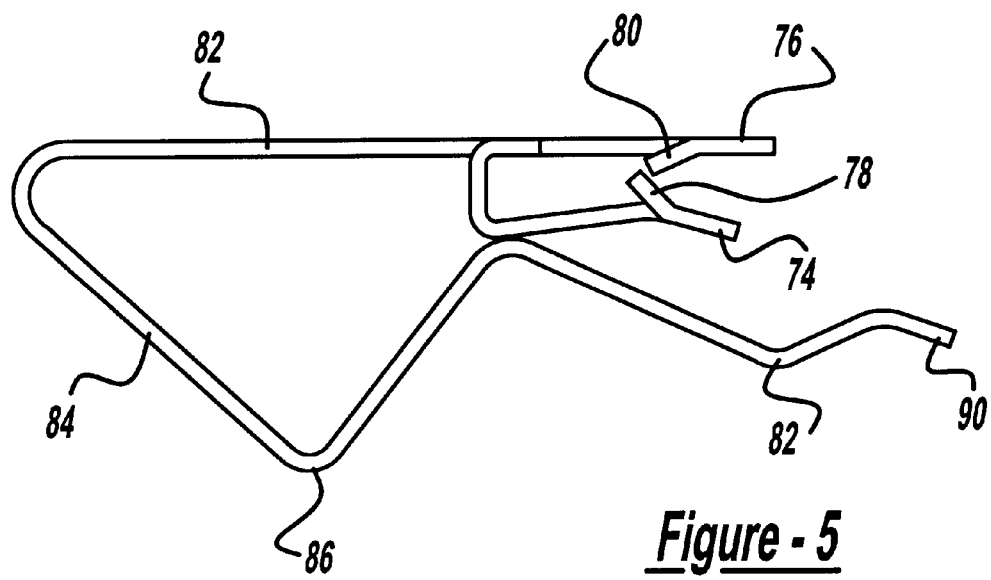
FIG. 5 is a side plan view of the spring clip of FIG. 4.

FIGS. 4 and 5 are a second embodiment of the present invention. A second spring clip is illustrated and designated with the reference numeral 70. The clip 70 includes a first pair of legs 72 with leg members 74 and 76. The leg members 74 and 76 include tabs 78 and 80 which frictionally secure to the first part 14 as mentioned above.

A second pair of legs 82 and 84 secure the spring clip 70 with a second part. The leg 82 is substantially flat and is coplanar with the leg 76. The leg 84 has a double hook configuration with two outwardly bulging knees 86 and 88. An angled foot 90 extends from the free end of leg 84. The foot 90 rests against the aperture of the second part. The knee 88 helps to maintain the first part 14 and the second part 16 in a first position similar to that illustrated in FIG. 2. The second hook or knee 86 extends further away from the leg 82 than the first knee 88. The second hook portion 86 maintains the spring clip with the second part when the first part is moved to a servicing position. The second leg 84 has an overall serpentine configuration with several straight portions and the outward bulging bends or knees 86 and 88, as well as an inward bend 92 between the outward bends 86 and 88.

The spring clip 70 is ordinarily stamped from a single piece of spring steel providing a unitary part. The spring clip 70 works substantially the same way as the spring clip 10.

While the above detailed description describes the preferred embodiment of the present invention, the invention is susceptible to modification, variation and alteration without deviating from the scope and fair meaning of the subjoined claims.

What is claimed is:

1. A spring clip for securing a first part to a second part, comprising a first pair of opposed legs for attaching a projection on the first part, a second pair of opposed legs surrounding the first pair of legs and formed to have outwardly extending portions to form a first hook for engaging edges surrounding a slot in the second part, a third pair of legs extending axially from the second pair of legs further into the slot in the second part when the spring clip is in place in the slot, the third pair of legs formed to have outwardly extending portions to form a second hook for engaging edges surrounding the slot in the second part, the second hook being wider than the first hook so that when the spring clip is in place, the first hook can be pulled out of the slot in the second part to enable the first part to be partially pulled away from the second part with the second hook then engaging the edges surrounding the slot in the second part to prevent the first part from being fully disengaged from the second part.

2. The spring clip according to claim 1, wherein said second legs each have an elongated S configuration in side elevation.

3. The spring clip according to claim 1, wherein said third pair of legs includes a flat planar leg and stepped leg including said outwardly extending portions forming said second hook.

4. A spring clip having at least two steps of engagement for securing a first part to a second part, comprising a retention member for engaging the first part, a first hook portion for insertion into a slot in the second part and engaging edges surrounding the slot, a second hook portion axially spaced from the first hook portion so that the second hook portion is behind the second part when the spring clip is in place with the first hook portion engaging the edges surrounding the slot in the second part, the first and second hook portions dimensioned so that the first hook portion can be pulled out of the slot with less force than required to pull the second hook portion out of the slot thus permitting the first part to be partially pulled away from the second part with the second hook then engaging the edges surrounding the slot to prevent the first part from being fully disengaged from the second part.

5. The spring clip according to claim 4, wherein said second hook outwardly project beyond said first hook.

6. The spring clip according to claim 4, wherein said first and second hooks are continuous with one another.

* * * * *